(12) United States Patent
Okazawa

(10) Patent No.: US 8,934,040 B2
(45) Date of Patent: Jan. 13, 2015

(54) IMAGING DEVICE CAPABLE OF SETTING A FOCUS DETECTION REGION AND IMAGING METHOD FOR IMAGING DEVICE

(75) Inventor: Atsuro Okazawa, Hino (JP)

(73) Assignee: Olympus Imaging Corporation (JP)

(*) Notice: Subject to any disclaimer, the term of this patent is extended or adjusted under 35 U.S.C. 154(b) by 86 days.

(21) Appl. No.: 13/612,266

(22) Filed: Sep. 12, 2012

(65) Prior Publication Data

US 2013/0070142 A1 Mar. 21, 2013

(30) Foreign Application Priority Data

Sep. 21, 2011 (JP) ................................. 2011-206145

(51) Int. Cl.
*H04N 5/222* (2006.01)
*G06F 3/041* (2006.01)
*H04N 5/232* (2006.01)

(52) U.S. Cl.
CPC ....... *H04N 5/23212* (2013.01); *H04N 5/23216* (2013.01); *H04N 5/23219* (2013.01)
USPC ..................... 348/333.01; 345/178

(58) Field of Classification Search
CPC ............................ G06K 9/46; H04N 5/23219
USPC ...................... 348/333.01; 345/178
See application file for complete search history.

(56) References Cited

U.S. PATENT DOCUMENTS

| | | | |
|---|---|---|---|
| 7,298,412 B2 | 11/2007 | Sannoh et al. | |
| 7,787,025 B2 | 8/2010 | Sanno et al. | |
| 7,903,163 B2 | 3/2011 | Ojima et al. | |
| 7,920,187 B2 | 4/2011 | Sanno et al. | |
| 7,973,853 B2 | 7/2011 | Ojima et al. | |
| 7,978,261 B2 | 7/2011 | Ojima et al. | |
| 2006/0290932 A1* | 12/2006 | Kawanami | 356/370 |
| 2009/0009652 A1* | 1/2009 | Sudo et al. | 348/349 |
| 2011/0115940 A1 | 5/2011 | Ojima et al. | |

FOREIGN PATENT DOCUMENTS

| | | |
|---|---|---|
| JP | 2010092066 | 4/2010 |
| JP | 2011030008 | 2/2011 |

* cited by examiner

*Primary Examiner* — Joel Fosselman
(74) *Attorney, Agent, or Firm* — Volpe and Koenig, P.C.

(57) ABSTRACT

An imaging device of the present invention comprises a display section for displaying a moving image that has been acquired by imaging, a touch panel, provided facing the display section, for detecting a touch position, a face detection section for detecting size and position of faces from within the moving image, a facial organ detection section for detecting the size and position of organs constituting a face that has been detected by the face detection section, and a designated image determination section for determining, from an operation position that has been detected by the touch panel, a size and position of a face that have been detected by the face detection section, and a size and position of organs that have been detected by the facial organ detection section, whether an image selected based on the operation position is at least a face or an organ.

10 Claims, 8 Drawing Sheets

IMAGING DEVICE CAPABLE OF SETTING A FOCUS DETECTION REGION AND IMAGING METHOD FOR IMAGING DEVICE

Benefit is claimed, under 35 U.S.C. §119, to the filing date of prior Japanese Patent Application No. 2011-206145 filed on Sep. 21, 2011. This application is expressly incorporated herein by reference. The scope of the present invention is not limited to any requirements of the specific embodiments described in the application.

BACKGROUND OF THE INVENTION

1. Field of the Invention

The present invention relates to technology with which a user can specify a region of part of an image displayed on a screen easily and as they intend, when carrying out AF (Auto Focus) etc.

2. Description of the Related Art

An imaging device provided with a touch panel on a screen on which a subject image is displayed, that sets a tracking region on image data displayed on the screen with a position that has been touched by the user as a center, is disclosed in Japanese Patent laid-open No. 2011-03008 (laid-open Feb. 10, 2011) (hereafter referred to as patent literature 1). With the imaging device disclosed in this patent literature 1, a region that has been subjected to touch designation is set as a tracking or autofocus region depending on the mode. Also, with this imaging device if a region that has been touch designated is recognized, shooting functions, such as tracking and focus, are associated.

Also, technology for automatically setting a focus region is disclosed, for example, in Japanese patent laid-open No. 2010-092066 (laid open Apr. 22, 2010) (hereafter referred to as patent literature 2). An imaging device disclosed in this patent literature 2 carries out setting by switching size of a focus region from a size of a face. Also, in the case where a result of face detection is that there is only a single face, a focus region is automatically set to a center position of the face or a position of the eyes, depending on whether or not eyes, nose, mouth and ears are further detected.

SUMMARY OF THE INVENTION

The present invention has as its object to provide an imaging device and an imaging method that can designate a region desired by a user, without the need for complicated operations.

An imaging device of the present invention comprises: a display section for displaying a moving image that has been acquired by imaging; a touch panel, provided facing the display section, for detecting a touch position; a face detection section for detecting size and position of faces from within the moving image; a face and organ detection section for detecting the size and position of organs constituting a face that has been detected by the face detection section; and a designated image determination section for determining, from an operation position that has been detected by the touch panel, a size and position of a face that have been detected by the face detection section, and a size and position of organs that have been detected by the face and organ detection section, whether an image selected based on the operation position is at least a face or an organ.

An imaging method for an imaging device of the present invention, for an imaging device having a display section for displaying a moving image that has been acquired by imaging, and a touch panel provided facing the display panel comprises: detecting presence or absence of a face from within the moving image; further detecting, when the result of detection is that a face has been detected, size and position of organs constituting the face; and determining, from an operation position of the touch panel, a display position and size of a face, and a size and position of organs, whether an image selected based on the operation position is at least a face or an organ.

DETAILED DESCRIPTION OF THE PREFERRED EMBODIMENTS

One embodiment of the present invention will be described in the following with reference to the drawings.

Figure 1:
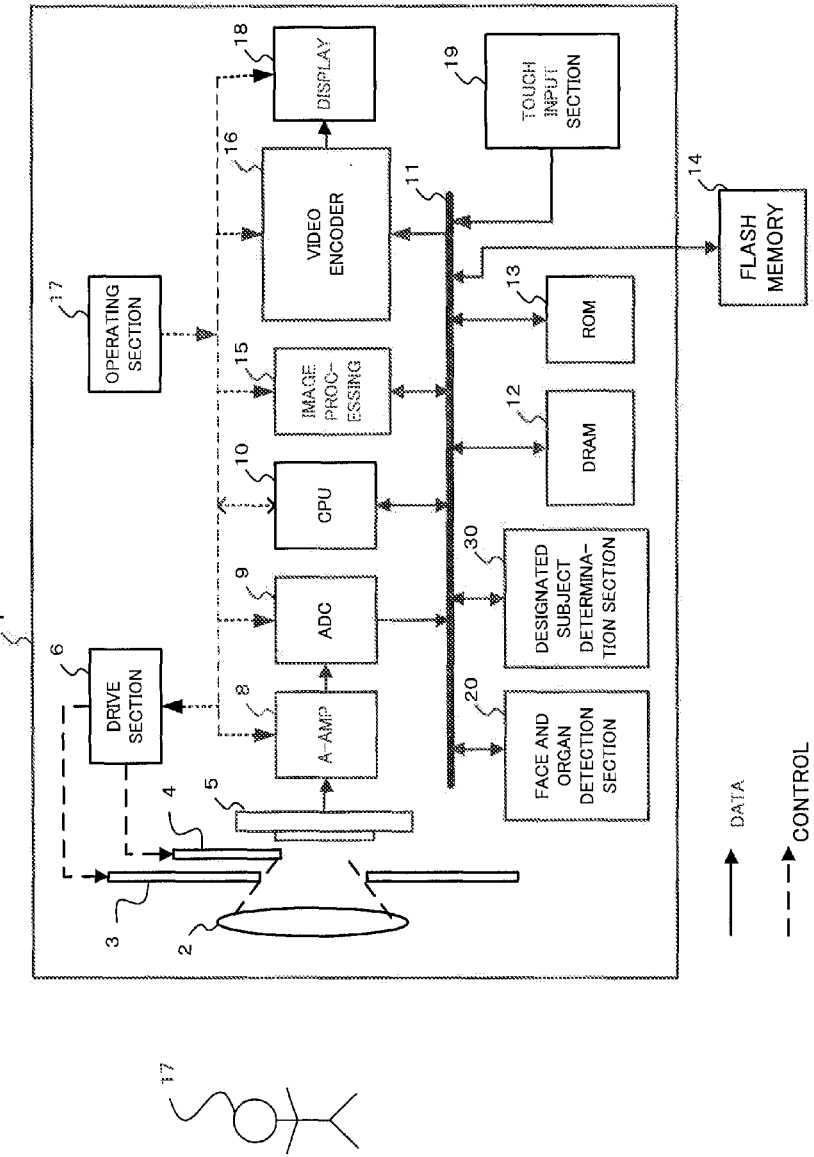
FIG. 1 is a block diagram showing the structure of an imaging device relating to one embodiment of the present invention.

FIG. 1 is a structural diagram of an imaging device. The imaging device is specifically a digital camera, and a device body 1 of this digital camera 1 is provided with a lens system 2 constituting an imaging optical system, a diaphragm 3, a mechanical shutter 4, and an image sensor 5. The diaphragm 3 and the mechanical shutter 4 are moved by drive of respective drive sections 6. The lens system 2 includes a focus lens system and a zooming lens system, and concentrates an optical image from a subject 7 onto the image sensor 5 by passing through the diaphragm 3 and the mechanical shutter 4.

The image sensor 5 photoelectrically converts an image of a subject 7 from the lens 2, and outputs as an analogue image signal. This image sensor 5 is constituted by a two-dimensional image sensor, and uses, for example, a CCD or CMOS sensor. An analog/digital converter (ADC) 9 is connected via an analog amplifier (A-AMP) 8 to an output terminal of this image sensor 5. The A-AMP 8 amplifies an analog image signal output from the image sensor 5, and the ADC 9 converts the analog image signal that has been amplified by the A-AMP 8 to a digital image signal.

A CPU (Central Processing Unit) 10 is housed inside the device body 1, and the ADC 9, a DRAM (Dynamic Random Access Memory) 12, ROM (Read Only Memory) 13, flash memory 14, image processing section 15 and video encoder 16 are connected to this CPU 10 via a bus 11. An operating section 17 is also connected to the CPU 10. A built in liquid crystal display (LCD), for example, is connected to the video encoder 16, as a display 18.

A digital image signal that has been output by the ADC 9 is temporarily stored in the DRAM 12, and a plurality of consecutive image data for different exposure times acquired by carrying out live view image processing on a digital image signal from the image processing section 15 are also stored in the DRAM 12.

Shooting control programs and image processing programs etc. for the CPU 10 are stored in the ROM13. The shooting control programs are executed in the CPU 10 and perform image processing of a digital image signal that has been obtained by subjecting an analog image signal output from the image sensor 5 to A/D conversion, display of a moving image of a subject 7 on the display 18 as a live view image, and acquisition of image data for a still image or movie at the time of shooting and display of that still image or movie on the display 18, and also perform overall shooting control within the device body 1, such as storage of the still image or movie in the FLASH memory 14 etc.

An image processing program realizes, in a face and organ detection section 20, a face detection function for detecting a first image region corresponding to a face section of a subject 7 from each of a plurality of consecutive image data for different exposure times, an organ detecting function for detecting a second image region corresponding to at least one organ within the face section from the first image region, and a face section correction function for correcting an image position of at least one organ on image data in accordance with movement position of a face section over the course of a plurality of image data.

The face detection function within the image processing program detects, from a plurality of image data, information relating to at least one of variation in size of a face section, movement in a horizontal direction, movement in a vertical direction, and variation in rotation or variation in inclination in the vertical or horizontal directions.

The face section correction function corrects coordinate position of an eyeball section, mouth section or nose section, as at least one organ, based on information relating to any one among variation in size of a face section of a subject 7, movement in the horizontal direction, movement in the vertical direction, or variation in inclination with respect to the horizontal direction or vertical direction.

The FLASH memory 14 holds image data of a still image and image data of a movie that have been processed in the image processing section 15, for storage via an interface section (not shown). This FLASH memory 14 is, for example, a memory card that can be removed from the device body, or a built-in memory provided inside the imaging device.

The operating section 17 is connected to operation switches for shooting or playback that are operated by the photographer, and detects operation of these operation switches. Specifically, the operation switches include, for example, a changeover switch for changing shooting modes of the camera, and a release switch that is activated by operation of a release button. Also, the release switch is a general-purpose 2-stage switch. That is, by pressing the release button down half way a first release switch is turned on to carry out focus detection and photometry, and a focused state is reached by driving a focusing lens. Further, by pressing the release button down fully, a second release switch is turned on an exposure is carried out.

The image processing section 15 carries out image processing of a digital image signal that was output from the image sensor 5 and subjected to A/D conversion by the ADC 9. Based on the image data that has been image processed, a subject 7 is subjected to movie display on the display 18 as a live view image via a video encoder.

This image processing section 15 generates a plurality of consecutive image data for different exposure times by carrying out live view processing on the digital image signal that has been output by the ADC 9.

A touch input section 19 has a touch panel provided on the display 18, and detects position or movement in response to a touch operation at a position corresponding to an image displayed on the display 18.

A designated position determination section 30 determines position and movement designated by a user's operation based on a touch position or touch operation detected by the touch input section 19, and display content of the display 18.

Figure 2:
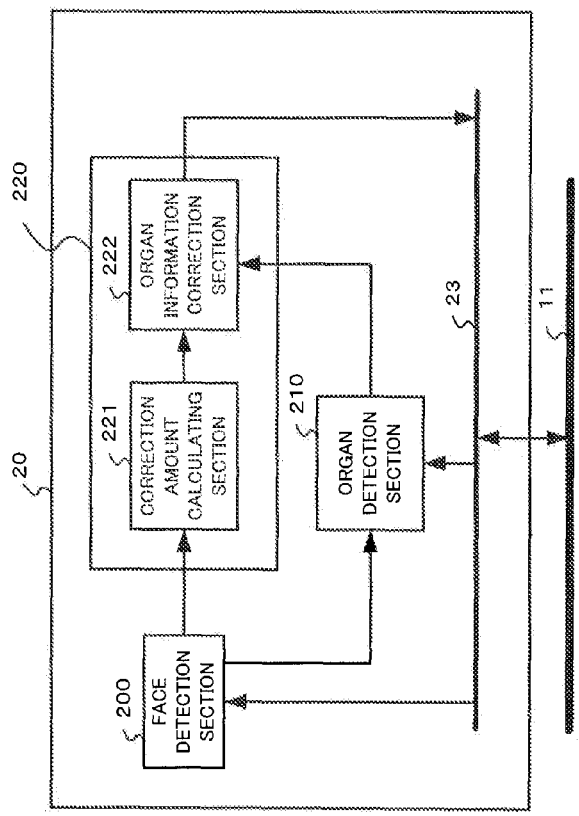
FIG. 2 is a block diagram showing the structure of a face and organ detection section of an imaging device relating to one embodiment of the present invention.

FIG. 2 is a block diagram showing the detailed structure of the above-described face and organ detection section 20. This face and organ detection section 20 has a face detection section 200, an organ detection section 210, and a face section correction section 220. These sections are each connected to an internal bus 23.

The face detection section 200 detects whether or not there is a face of a subject 7 from a respective plurality of image data that are consecutive and for different shooting times temporarily stored in the DRAM 12, and detects a first image region corresponding to a face section. Specifically the face detection section 200 detects, from the plurality of image data, information relating to variation in size of a face section, movement in a horizontal direction, movement in a vertical direction, and at least one of variation in rotation or variation in inclination in the vertical or horizontal directions.

The organ detection section 210 detects a second image region corresponding to at least one organ within a face, for example, an eyeball section, mouth section or nose section, from the first image region detected by the face detection section 200.

The face detection section 200 and the organ detection section 210 are operated asynchronously from one another. Specifically, the face detection section 200 and the organ detection section 210 carry out detection independently of each other.

The face section correction section 220 is for correcting image position on image data for at least one organ, for example an eyeball section, mouth section, or nose section, detected by the organ detection section 210 in accordance with movement position of a face section on a plurality of image data that have been detected by the face detection section 200, and has a correction amount calculating section 221 and an organ information correction section 222.

Of these, the correction amount calculating section 221 detects coordinate positions of a face section for each of the plurality of image data detected by the face detection section 200 and tracks movement position of the face section on the plurality of data to calculate a movement amount of the face section, and makes this movement amount of the face section a movement amount for the coordinate position.

Specifically, the correction amount calculating section 221 calculates amounts relating to at least one of variation in size of a face section of a person who is a subject detected by the face detection section 200, movement amount in the horizontal direction, movement amount in the vertical direction, and amount of rotational variation and amount of variation in inclination with respect to the horizontal or vertical directions, from image position variation between the plurality of image data, and further, based on these amounts respectively calculates correction amount for variation in size of the face of a person, correction amount for movement in the horizontal direction, correction amount for movement in the vertical direction, and correction amount for rotational variation or correction amount for variation in inclination with respect to the vertical or horizontal direction.

The organ information correction section 222 receives at least one of correction amount for variation in size of a face section of a person, correction amount for movement in the horizontal direction, correction amount for movement in the vertical direction, and correction amount for variation in rotation and correction amount for variation in inclination in the horizontal or vertical directions, calculated by the correction amount calculating section 221, and corrects position of at least one organ, for example, an eyeball section, mouth section or nose section, detected by the organ detection section 210, using the correction amounts.

Also, the organ information correction section 222 receives at least one correction amount that has been calculated by the correction amount calculating section 221, and corrects size of at least one organ, for example, an eyeball section, mouth section or nose section detected by the organ detection section 210 on the image data, using the correction amount.

Also, the organ information correction section 222 corrects at least one of size, inclination or coordinate position of an eyeball section, mouth section or nose section detected by the organ detection section 210, based on correction amount for rotational variation of a face section of a person calculated by the correction amount calculating section 221.

Also, if variation in inclination of the face section of a subject 7 calculated by the correction amount calculating section 221 with respect to the horizontal or vertical direction is detected, the organ information correction section 222 does not perform correction using variation in size of the face section, movement in the horizontal direction, movement in the vertical direction or variation in rotation.

The image processing section 15 carries out image processing, such as, for example, changing contrast of an eyeball section, or filter processing, for a face section, or an eyeball section, mouth section or nose section, based on at least one of size of an eye section, mouth section or nose section, and inclination and coordinate position, that has been corrected by the face section correction section 220.

Also, the CPU 10 carries out recognition processing in order to specify a person as a subject based on at least size, inclination or coordinate position of an eyeball section, mouth section or nose section that has been corrected by the face section correction section 220. With this recognition processing, reference image data for face sections of a plurality of people stored in advance in the ROM 13 are read out, and recognition processing is carried out in order to specify a person by comparing at least one of size, inclination or coordinate position of an eyeball section, mouth section or nose section that have been corrected by the face section correction section 220 with at least one of size, inclination or coordinate position of an eyeball section, mouth section or nose section of the reference image data.

The CPU 10 also has a function to determine a focal point detection region for image data including at least image position that has been corrected by the face section correction section 220, and carry out focusing based on image data of the focal point detection region.

Figure 3:
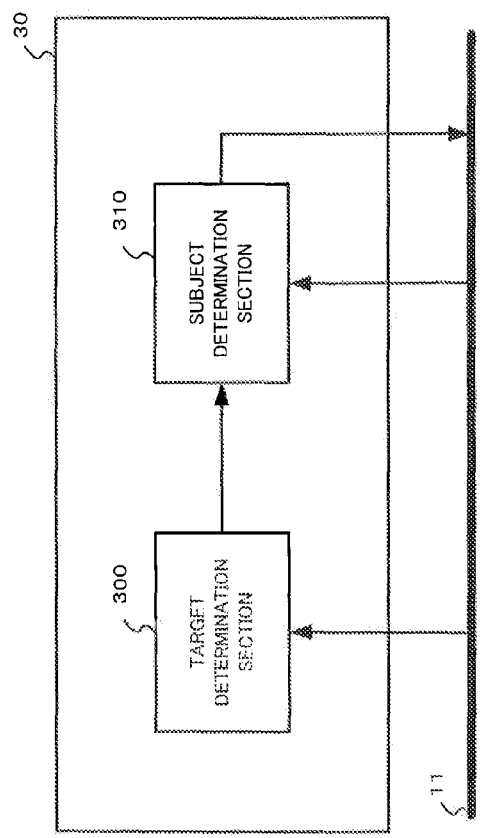
FIG. 3 is a block diagram showing the structure of a designated position determination section of an imaging device relating to one embodiment of the present invention.

FIG. 3 is a block diagram showing the detailed structure of a designated position determination section 30. This designated position determination section 30 comprises a target determination section 300 for determining a face/organ to be made a designated target, and a subject determination section 310 for determining a subject for a position designated by operation of a touch panel input section 19. The target determination section 300 and the subject determination section 310 are connected to a bus 11.

The target determination section 300 receives information for a face/eyeball section detected by the face and organ detection section 20, and determines whether the subject of focus is a face or an eyeball based on this information (in particular, size of the face/eyeball section).

The subject determination section 310 determines whether or not a designated subject is in the vicinity of a face of a person from a touch position or operation detected by the touch input section 19. The determination result of the target determination section 300 is then received, the subject determination section 310 infers a subject on a screen designated by operation of the touch input section 19, and a designated position is determined in accordance with a displayed image.

Figure 4:
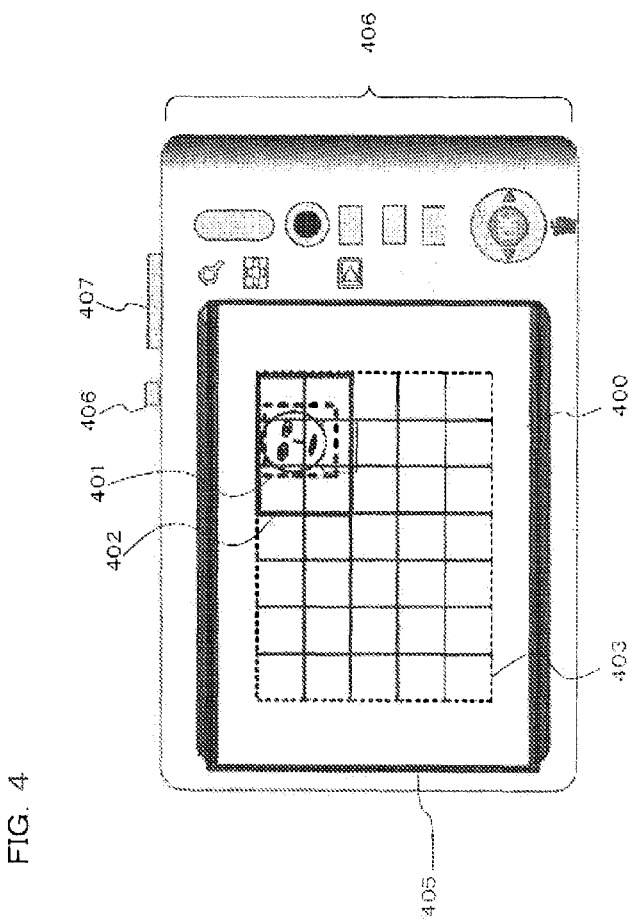
FIG. 4 is a rear elevation of an imaging device relating to one embodiment of the present invention.

FIG. 4 shows arrangement of a display 18 provided on the rear surface of a digital camera, and a touch panel provided facing this display 18 and various operation members of the operating section 17.

A display section 400 displays images and shooting information etc. for the display 18. A touch panel region 405 that is sensitive to touch panel input is provided on this display section 400. An AF area divided section 403 is provided in a partial region within the touch panel region 405. The AF area divided section 403 is capable of detecting degree of focus in each divided region, and normally display of the divided region is not carried out.

In the case where AF is carried out at the time of shooting, a focus region corresponding to a shot scene is determined within the divided regions of the AF area divided section 403, and framed on the display section 400 as a focus region 402. Also, in the case where a face exists within the shot image frame, a face detection region 401 is displayed in a frame on the display section 400, to notify the photographer. Beside that, as operation members of the operating section 17, an ON/OFF switch 406 for a power supply, and a release button 407 are arranged on an upper surface of the imaging device 1, and an operation section 406 made up of a zoom switch, menu button and select operation key etc. is arranged on a rear surface of the imaging device 1.

Next, operation of the imaging device constructed as described above will be described in accordance with the imaging control flowchart shown in FIG. 5.

In step S1, the CPU 10 issues commands to display a live view image on the display 18, and the image sensor 5 photoelectrically converts an image of a subject 7 from the lens 2, and outputs as an analogue image signal. An analog image signal output from the image sensor 5 is amplified by the A-AMP 8, and converted to a digital image signal by the ADC 9. The image processing section 15 is input with a digital image signal from the ADC 9 via the bus 11, subjects this digital image signal to image processing, and displays on the display 18 as a live view image of the subject 7.

At this time, a digital image signal that has been output from the ADC 9 is temporarily stored in the DRAM 12, and a plurality of consecutive image data for different exposure times acquired by carrying out live view image processing on a digital image signal from the image processing section 15 are also stored in the DRAM 12.

The CPU 10 issues an instruction for face detection to the face detection section 200 in step S2. This face detection section 200 detects a first image region corresponding to a face section of a subject 7 from a respective plurality of image data that are consecutive and for different shooting times stored in the DRAM 12. In this case, the face detection section 200 detects, from the plurality of image data, information relating to variation in size of a face section, movement in a horizontal direction, movement in a vertical direction, and at least one of variation in rotation or variation in inclination in the vertical or horizontal directions.

Face section detection processing for image data commences immediately after completion of display of image data on the liquid crystal display, and is finished before completion of display of image data for the next frame on the liquid crystal display. A position coordinate for a face section is detected as a result of this face section detection processing for the image data. The result of face section detection processing for this image data can then be displayed as a face detection region on the next image data.

Face detection compares model patterns in which face characteristics have been generalized with data for each region within image data, and detects whether or not regions of high similarity exist. At this time, model patterns of a plurality of sizes are created for acquired images, and by carrying out degree of similarity matching, matching is carried out in accordance with an assumed range of face sizes. Presence or absence of a face, and position and size, are detected from these results. Here, coordinate positions for face sections of each of a plurality of image data detected by the face detection section 200 are detected, and movement amount of a face section is calculated from a difference in these coordinate positions.

Next, based on the result of face detecting processing in Step S2, it is determined whether or not there is a face in step S3. If the result of this determination is that a face has been detected, processing moves to step S4. In step S4, a coordinate position of the detected face on the display screen is set based on regions of high degree of similarity acquired from regions and coordinates subjected to matching in step S2.

Next, processing moves to step S5, and a face frame is drawn at the coordinate position on the display screen that was set in step S4. After that, in step S6, sites, namely organs, of a face including at least an eyeball are detected by the organ detection section 210 from a detected face region.

In step S7, an image region corresponding to at least one organ within a face, for example, an eyeball section, mouth section or nose section, is detected by the organ detection section 210 from the image region detected by the face detection section 200. This organ detection is carried out based on position coordinates of a face section acquired from face section detection results. For example, detection processing for an organ such as an eyeball section of image data involves detection of the size, shape, contrast and edge information for each feature section of an eyeball section, mouth section or nose section, etc. within a face section, based on position coordinates of the detected face section. Organ position coordinates are then acquired from this detection result.

Once the processing of step S7 as been carried out, or if it was determined in step S3 that a face was not detected, processing moves to step S8, where it is determined whether or not there was a touch operation on the touch input section 19 (or if there was a pressing down operation). If the result of this determination is that there has not been a touch operation, processing returns to step S2. On the other hand, if it is determined that there has been a touch operation, processing moves to step S9 where processing to determine a subject chosen by the operator is carried out. Using this subject determination processing it is determined which image site the operator wants to designate as an image target, on the basis of features of an image displayed at or close to a touch operation position that was detected by the touch input section 19. Details of this subject determination processing will be described later using FIG. 6.

If the subject determination processing of step S9 has been carried out, a region corresponding to the determined image site is set as an AF focus region in step S10. A focus lens of the lens system 2 is then driven to a focal point by the drive section 6 so as to focus on the subject within this AF focus region in step S11, and in step S12 still picture shooting is carried out and image data acquired by the shooting is stored in the FLASH memory 14.

Figure 5:
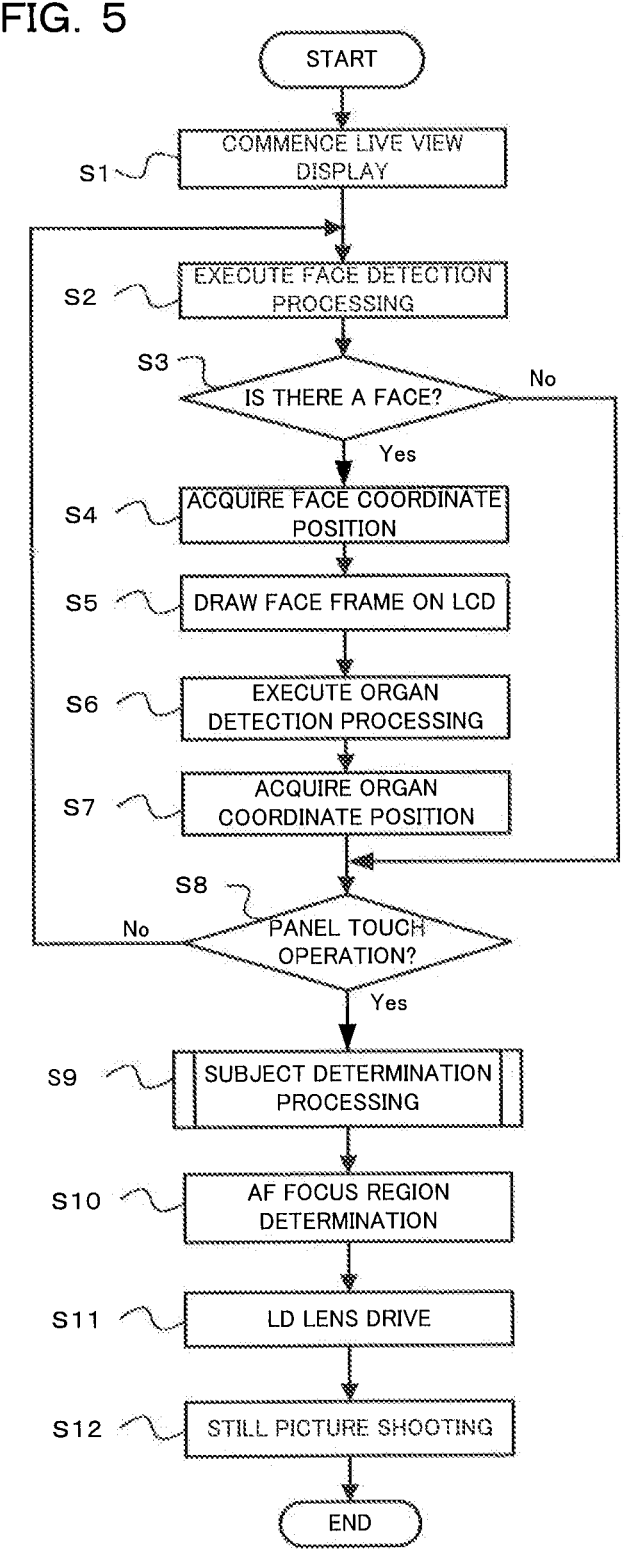
FIG. 5 is a flowchart showing a still picture shooting operation of the imaging device of one embodiment of the present invention.
Figure 6A:
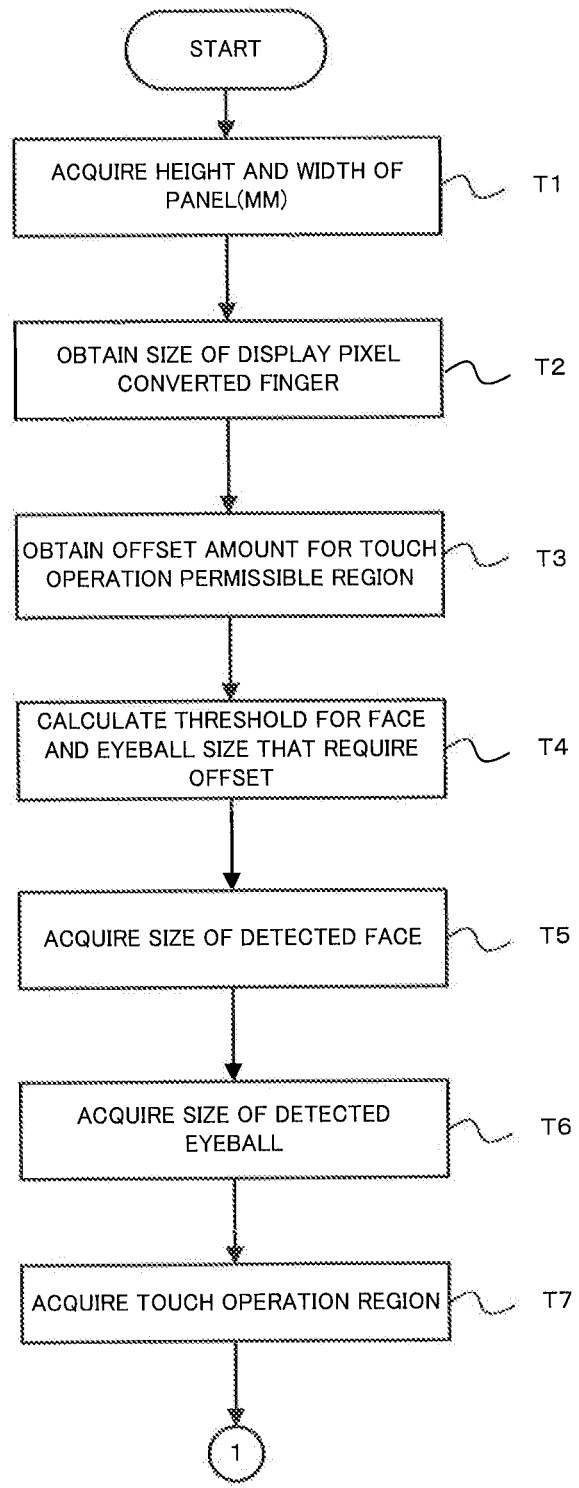
FIG. 6A and FIG. 6B are subject determination processing flowcharts showing a still picture shooting operation of the imaging device of one embodiment of the present invention.
Figure 6B:
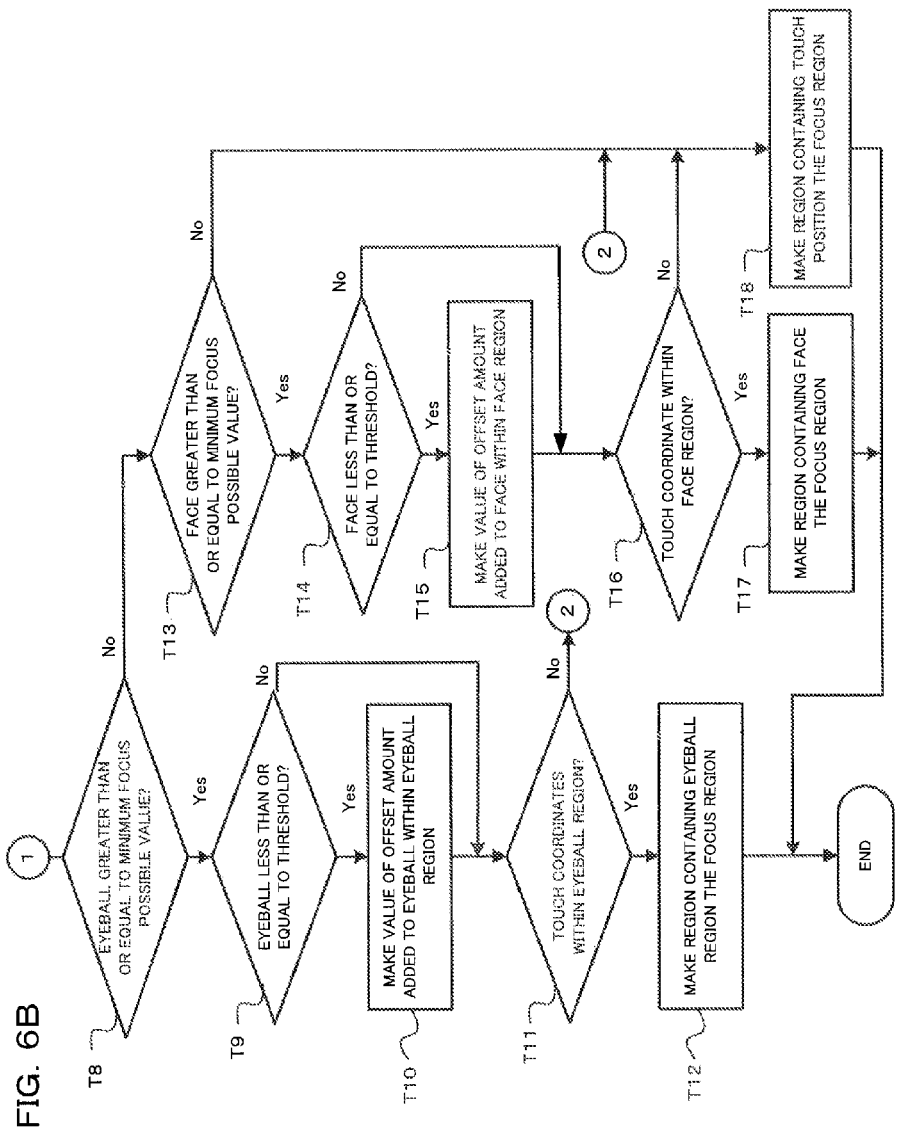

FIG. 6A and FIG. 6B are flowcharts for the subject determination processing of step S9 in FIG. 5. First, in step T1, values for the height and width of the image display panel of the display 18 are acquired. The values for height and width are previously stored in ROM 13.

Next, in step T2, size of an average finger that has been calculated at a display image pixel of the display 18 is read out from ROM 13, and in step T3 a permissible offset amount considered to be a touch operation position for the case of the size of this finger is read out from ROM 13. As the permissible offset amount, for example, a value that is ½ of the size of the average finger that was read out from ROM 13 is set.

Next, in step T4, the size of a face or eyeball that requires offset is calculated from a relationship between the finger and the size of a face or eyeball displayed on the display 18. For example, a size such that the size of the face or eyeball becomes 1.2 times the size of the average finger or less is made a size that requires offset.

In step T5, the size of the face that was detected in step S7 in FIG. 4 is read out, and then, in step T6, the size of a pupil of the detected eyeball section is readout. Here, the size of the face and the size of the pupil of the eyeball section are stored in a primary storage memory, not shown.

In step T7, a region of a touch operation that was detected by the touch input section 19 is acquired. In step T8, it is determined whether or not the size of the detected pupil is equal to or greater than a minimum size at which AF is possible. Here, the minimum size at which AF is possible is set to, for example, a size that is ½ or greater than the unit region of the AF focus region.

In the event that the determination in step T8 is that the size of the pupil is of a size such that AF focus is possible, processing advances to step T9 where it is determined whether or not the size of the pupil is less than or equal to a predetermined threshold. Here, if the pupil is less than or equal to the threshold it is considered to be a case of while AF is possible display size of the pupil is small and it is not possible to accurately perform a touch operation for the pupil position, and in step T10 a value having an offset amount added to the size of the pupil is set as a region in which a pupil exists. On the other hand, if the size of the pupil is larger than the predetermined threshold, it is considered to be a state where it is possible to accurately perform a touch operation at the pupil position, and the region in which the pupil exists is itself set as the region in which the pupil exists, without adding the offset amount.

Next, in step T11 it is determined whether or not the coordinates of the touch operation are within a region in which a pupil exists that has been set as described above. If the result of this determination is that the coordinates are within the region, then in step T12 an AF detection region including the pupil region is set as a focus detection region.

If the size of the pupil detected in previously described step T8 was determined to be smaller than the minimum size for which AF focus is possible, then it is not possible to perform AF on the pupil. Accordingly, this case is considered to be one where AF is performed on a face. Therefore, in step T13 it is determined whether or not the size of the face that was acquired in step T5 is equal to or greater than the minimum size for which AF focus is possible. Here, a specific pixel size is set as the minimum size at which AF focus is possible.

In the event that it is determined in step T13 is that the size of the face is of a size such that AF focus is possible, processing advances to step T14 where it is determined whether or not the size of the face is less than or equal to a predetermined threshold. Here, if the face is less than or equal to the threshold it is considered to be case where AF is possible but display size of the face is small and it is not possible to accurately perform a pressing down operation for the face position, and in step T15 a value having an offset amount added to the size of the face is set as a region in which a face exists.

On the other hand, if the result of determination in step T14 is that the size of the face is larger than the predetermined threshold, it is considered to be a state where it is possible to accurately perform a pressing down operation at the face position, and the region in which the face exists is itself set as the region in which the face exists, without adding the offset amount.

Next, it is determined in step T16 whether or not the coordinates that were pressed down are within a set region in which a face exists, and if the coordinates are determined to be within the region then in step T17 a region including the face region is set as a focus detection region.

If it was determined in step T13 that the size of a detected face was smaller than the minimum size at which AF focus is possible, or if it was determined in step T11 that the pressed down coordinates were not within a set region in which a face exists, or if it is determined in step T16 that the pressed down coordinates were not within a set region in which a face exists, it is estimated that display size of the face is too small and that it will be difficult to focus only on the face. In this case, in step T18 an AF detection region constituting a wider region, and including a face region, is set as a focus detection region.

Figure 7:
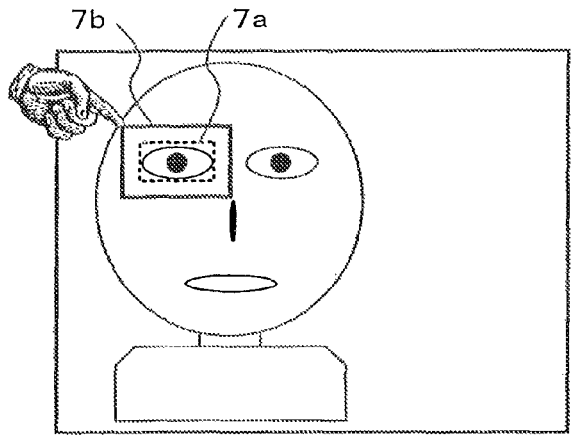
FIG. 7 is a drawing showing a first display example of designated position of an imaging device relating to one embodiment of the present invention.
Figure 8:
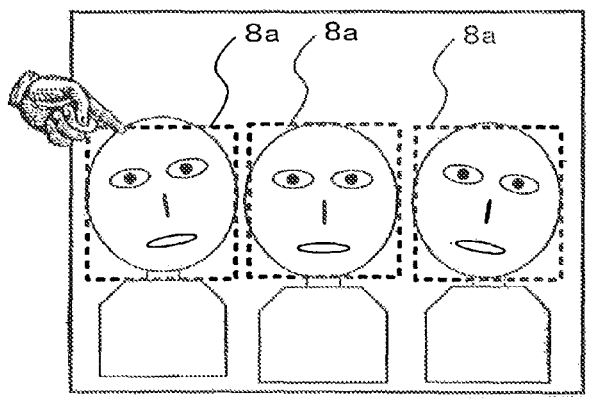
FIG. 8 is a drawing showing a second display example of designated position of an imaging device relating to one embodiment of the present invention.
Figure 9:
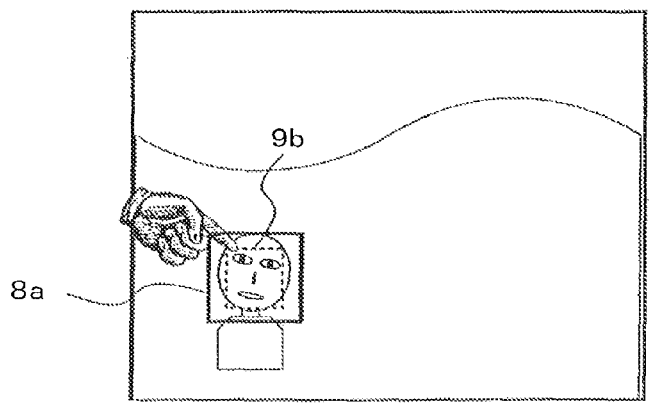
FIG. 9 is a drawing showing a third display example of designated position of an imaging device relating to one embodiment of the present invention.

FIG. 7 to FIG. 9 illustrate examples of setting AF focus region in the case where subject determination processing shown in FIG. 6A and FIG. 6B has been executed, for various examples of shooting scene displayed on the display 18.

FIG. 7 shows an example where the operator designates the vicinity of a right eye of a person by a touch operation, on the screen, in a scene shot with a close up of a persons face. This scene often appears, for example, with portrait shooting.

With this example shown in FIG. 7, the face is sufficiently large and a detection region (subject region) corresponding to an eyeball detected in step T6 of the processing of FIG. 6 is displayed as a frame 7b, and further, it is determined in step T9 that the eyeball is less than or equal to a specified value and in step T10 a region having an offset amount added to the size of the eyeball (subject region including a corrected region) is displayed as a frame 7a. In this manner, with the example shown in FIG. 7, it is determined that a touch operation at the illustrated position is an operation to choose the eyeball, and in step T12 a region including an eyeball region is set as a focus region for AF evaluation.

FIG. 8 shows an example where the operator designates the vicinity of a person on their left by a touch operation, on the screen, in a close up shot of a number of people's faces. This scene often appears, for example, with shooting a snapshot.

With this example shown in FIG. 8, in step T6 of the processing of FIG. 6 a region including the detected eyeball position (subject region) is displayed as a frame 8a. Further, in step T13 it is determined that a face is greater than or equal to a specified value, and a region including the face region is set as a focus region for AF evaluation in step T17.

FIG. 9 shows an example where the operator designates the vicinity of a person by a touch operation, on the screen, in a scene shot with a person being small in size. This scene often appears, for example, when shooting scenery.

With this example shown in FIG. 9, the face is sufficiently small and in step T6 of the processing in FIG. 6 a detection region (subject region) including a detected eyeball position is displayed as a frame 9b, and further, in the case where it is determined in steps T13 and T14 that a face is greater than or equal to a minimum value at which focus is possible, and it is determined that the face is less than or equal to a threshold, then in step T15 a region that has an offset amount added to the size of the face (subject region including a correction region) is displayed as a frame 8a, In this manner, with the example shown in FIG. 9, it is determined that a touch operation at the illustrated position is an operation to choose the face, and in step T17 a region including a face region is set as a focus region.

In this way, with the one embodiment of the present invention, for a region including a position where there was a touch operation, whether a target selected based on the position of the touch operation is a face or an organ (for example an eyeball) is determined based on the position of the touch operation, size of a detected face, or size of a geometric shape, such as an eyeball. As a result, it is possible to designate a region as intended by the operator, without the need for complicated operations.

Also, with the one embodiment of the present invention, it is determined whether or not the size of a face detected by the face detection section 200 and the size of an organ (for example an eyeball) detected by the organ detection section 210 are less than or equal to a minimum size for a focus detection region in which automatic focusing is possible (refer to T8 and T13 in FIG. 6B), and in accordance with the determination results one of the focus determination regions containing a face coordinate position output by the face detection section 200, an organ site position output by the organ detection section 210, or a touch operation position, is set as a focus detection region (refer to T12, T17 and T18 of FIG. 6B). As a result, it is possible to set a region for which automatic focus is possible, as intended by the operator, without the need for complicated operations.

Also, with the one embodiment of the present invention, in the case where a face detected by the face detection section 200 is greater than or equal to a specified size (Yes in T13 of FIG. 6B), either a position of a face detected by the face detection section 200 or an operation position output from the touch panel (touch input section 19) is determined to be a focus determination region (T17 or T18 of FIG. 6B). As a result, it is possible to set the face of a person or the position of a touch operation to a focus region, as intended by the operator, without the need for complicated operations.

Also, with the one embodiment of the present invention, in the case where an organ (for example an eyeball) detected by the organ detection section 210 is greater than or equal to a specified size (Yes in T8 of FIG. 6B), either a position of an organ detected by the organ detect ion section 210 or an operation position output from the touch panel (touch input section 19) is determined to be a focus determination region (T12 or T18 of FIG. 6B). As a result, it is possible to set the eyeball of a person or the position of a touch operation to a focus region, as intended by the operator, without the need for complicated operations.

Also, with the one embodiment of the present invention, in the case where an output result of the face and organ detection section 20 is that the size of a region in which focus detection is possible is greater than a minimum size (T8 or T13 in FIG.

6B), and the output result of the face and organ detection section is smaller than a specified value (T9, T14), a region related to the touch-operated position, for which it is determined whether or not a face or organ position, is made wider (T10, T15). As a result, even in a case where the size of an organ, such as an eyeball, or a face is small, since the region is made wider it is possible to set a region for which automatic focus is possible, as intended by the operator, without the need for complicated operations.

Also, with the one embodiment of the present invention, a permissible offset amount is obtained based on size of an average finger, and a region including a touch operation position is determined based on this permissible offset. As a result, even in a case where a display screen of the display 18 is small, since the size of the operator's finger is taken into consideration, it is possible to obtain correction to a position that the operator touched, and it is possible to prevent erroneous determination of a different region to that which is intended.

The present invention is not limited to the above-described embodiment, and it is also possible to apply to other situations having the same result. For example, the imaging device is not limited to a digital camera, and the present invention can also be applied to a device having an imaging function, for example, a mobile phone, lap top computer etc.

Also, the face section correction section 220 can also carry out detection of shape characteristics and profile characteristics of an organ, such as an outline of an eyeball section, nose section or mouth section, for example, and chin outline information, to correct a coordinate position, using the same method as for correction of coordinate positions for an organ such as an eyeball section, nose section and mouth section. Carrying out correction to coordinate position based on information on shape characteristics and profile characteristics of an organ enables reduction in calculation time required for detection by detecting partial information of an organ, and it is possible to make processing high speed.

Also, with the one embodiment of the present invention a face section of a person is imaged as a subject, but this is not limiting and it is also possible to have an animal for example. Also, with the above described one embodiment, an AF focus region is chosen based on touch operation position, but this is not limiting and it is also possible to use other conditions relating to shooting, such as, for example, a photometry region, a white balance detection region, a tracked subject designation region or a main subjected designation region.

With the one embodiment of the present invention, particularly expanded display was not carried out for an image of a region that was subjected to a touch operation, but it is also possible expand and display an image corresponding to a region where there was a touch operation in accordance with detection results of the face and organ detection section 20. For example, it is possible to carry out expanded display in the case where the size of a detected face is small, or it is possible to carry out expanded display only in the case where the size of a detected eyeball is small.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to the above-described embodiment, and structural elements may be modified in actual implementation within the scope of the gist of the embodiments. It is also possible form various inventions by suitably combining the plurality structural elements disclosed in the above described embodiments. For example, it is possible to omit a few structural elements from all of the structural elements shown in the embodiment. It is also possible to suitably combine structural elements from different embodiments.

What is claimed is:

1. An imaging device, comprising:
a display section for displaying a moving image that has been acquired by imaging;
a touch panel, provided facing the display section, for detecting a touch position;
a face detection section for detecting size and position of faces from within the moving image;
a facial organ detection section for detecting the size and position of organs constituting a face that has been detected by the face detection section; and
a designated image determination section for determining, from an operation position that has been detected by the touch panel, a size and position of a face that has been detected by the face detection section, and a size and position of organs that have been detected by the facial organ detection section, whether an image selected based on the operation position is at least a face or an organ;
wherein the designated image determination section, in the event that the size of a face or organ that has been detected by the facial organ detection section is a size for which focus detection is possible, and further that the size occupied by the face or organ within the display section is smaller than a determination standard based on a size of a finger that operates the touch panel and has been subjected to averaging processing, enlarges a determination region having a first, predetermined size, for determining whether an image corresponds to the face or organ, in accordance with a position that has been subjected to a touch operation on the touch panel.

2. The imaging device of claim 1, wherein:
region setting section for setting a region for detecting data relating to shooting, from an image region containing a face or organ that has been designated by the designated image determination section.

3. The imaging device of claim 1, further comprising:
a focus detection region setting section, wherein
the focus detection region setting section determines whether or not the size of a face detected by the face detection section and the size of an organ detected by the organ detection section are less than or equal to a minimum size for a focus detection region in which automatic focusing is possible, and in accordance with the determination results a focus determination region containing one of either a face coordinate position output by the face detection section, an organ site position output by the organ detection section, or an operation position, is set as a focus detection region.

4. The imaging device of claim 1, wherein:
when a face detected by the face detection section is greater than or equal to a specified size, the designated image determination section determines either a position of a face detected by the face detection section or an operation position output from the touch panel to be a focus determination region.

5. The imaging device of claim 1, wherein:
when an organ detected by the organ detection section is greater than or equal to a specified size, the designated image determination section determines either a position of an organ detected by the organ detection section or an operation position output from the touch panel to be a focus determination region.

6. The imaging device of claim 1, wherein:
the designated image determination section displays an image corresponding to a region where a touch operation has been detected on the touch panel in enlarged form, in accordance with output results of the face and organ detection section.

7. The imaging device of claim 1, wherein:
the designated image determination section obtains a permissible offset amount in accordance with size of an average finger, and, based on the permissible offset amount, determines a region including a touch operation position, and carries out organ detection within this region using face detection output from the face detection section and organ detection output from the face and organ detection section.

8. The imaging device of claim 1, further comprising:
a focus detection region setting section, wherein
the organ includes a pupil, and
the focus detection region setting section sets a region including a pupil as the focus detection region in the event that a pupil exists within the enlarged determination region.

9. The imaging device of claim 1, further comprising:
a focus detection region setting section, wherein
the organ includes a pupil, and
the focus detection region setting section sets a region containing the detected touch position in the event that a pupil does not exist within the enlarged determination region.

10. An imaging method for an imaging device having a display section for displaying a moving image that has been acquired by imaging, and a touch panel provided facing the display panel, comprising:
detecting presence or absence of a face from within the moving image;
further detecting, when the result of detection is that a face has been detected, size and position of organs constituting the face, and
determining, from an operation position of the touch panel, a display position and size of a face, and a size and position of organs, whether an image selected based on the operation position is at least a face or an organ;
wherein in the event that the size of a face or organ that has been detected is a size for which focus detection is possible, and further that the size occupied by the face or organ within the display section is smaller than a determination standard based on a size of a finger that operates the touch panel and has been subjected to averaging processing, a determination region having a first, predetermined size, for determining whether or not an image corresponds to the face or organ, is enlarged in accordance with a position that has been subjected to a touch operation on the touch panel.

* * * * *